United States Patent [19]
Koos et al.

[11] Patent Number: 5,926,508
[45] Date of Patent: Jul. 20, 1999

[54] COMMUNICATION SCHEME USING NON-COHERENT FREQUENCY DETECTION OF TRELLIS-BASED CODING OF PLURAL TRANSMISSION FREQUENCIES PER BAUD

[75] Inventors: Larry W. Koos, Sanford; William M. Koos, Jr., Altamonte Springs; Peter E. Mallory, New Smyrna Beach, all of Fla.

[73] Assignee: Koos Technical Services, Inc., Longwood, Fla.

[21] Appl. No.: 08/391,965

[22] Filed: Feb. 21, 1995

[51] Int. Cl.$^6$ ............... H04L 27/28; H04L 5/12; H04L 23/02
[52] U.S. Cl. ............ 375/242; 375/265; 371/43.4; 455/61
[58] Field of Search ............... 375/242, 243, 375/244, 245, 246, 248–251, 253, 260, 262, 265, 343, 341, 316; 341/50, 51, 143, 173; 371/37.1, 43.4; 455/3.2, 61; 348/388, 426

[56] References Cited

U.S. PATENT DOCUMENTS

| | | | |
|---|---|---|---|
| 4,457,004 | 6/1984 | Gersho et al. | 375/265 X |
| 4,945,549 | 7/1990 | Simon et al. | 371/43 |
| 4,980,897 | 12/1990 | Decker et al. | 375/265 |
| 5,204,874 | 4/1993 | Falconer et al. | 370/209 |
| 5,233,629 | 8/1993 | Paik et al. | 375/265 X |
| 5,243,629 | 9/1993 | Wei | 375/265 |
| 5,418,798 | 5/1995 | Wei | 375/265 X |

OTHER PUBLICATIONS

Dixon, Robert C, "Spread Spectrum Systems with Commerical Applications" 3rd Ed., pp. 141–142, 1994.

Lee et al., Trellis Coding of Non–coherent Multiple Symbol Full Response M–ary CPFSK with Modulation Index 1/M, MILCON Jan. 1994.

Ennaciri et al., Analysis of performance of a TCM–OFDM multicarrier digital in the mobile radio, Jan., 1995.

*Primary Examiner*—Chi H. Pham
*Assistant Examiner*—Bryan Webster
*Attorney, Agent, or Firm*—Charles E. Wands

[57] ABSTRACT

A reduced cost, robust data communication scheme for very small aperture terminal satellite communication systems combines non-coherent frequency detection and trellis-coded, multi-frequency modulation. The data code width is associated with the size of a multiple frequency set and the selection of a given combination of frequencies for transmission during a respective baud. One portion the data is convolutionally encoded and points to an orthogonal signal set associated with frequencies of a partitioned multiple frequency set. Another portion of the data identifies the frequency combination within the group pointed to by the one portion. The combined portions encode a multi-frequency transmission waveform. At the receiver, the multi-frequency tone sequence is detected by non-coherent frequency detection. For each baud, matched filters output a most likely set of frequencies transmitted during that baud, as soft decisions to a Viterbi decoder.

64 Claims, 2 Drawing Sheets

```
 1    1    1    0    0    0    0    0    0    0    0    0  ← 3/12 PATTERN

|ON  ON   ON |←---------- OFF ------------→

F1   F2   F3   F4   F5   F6   F7   F8   F9  F10  F11  F12

1    0    0    1    1    0    0    0    0    0    0    0  ← 3/12 PATTERN

ON  OFF  OFF  ON   ON  ←-------- OFF ----------→
```

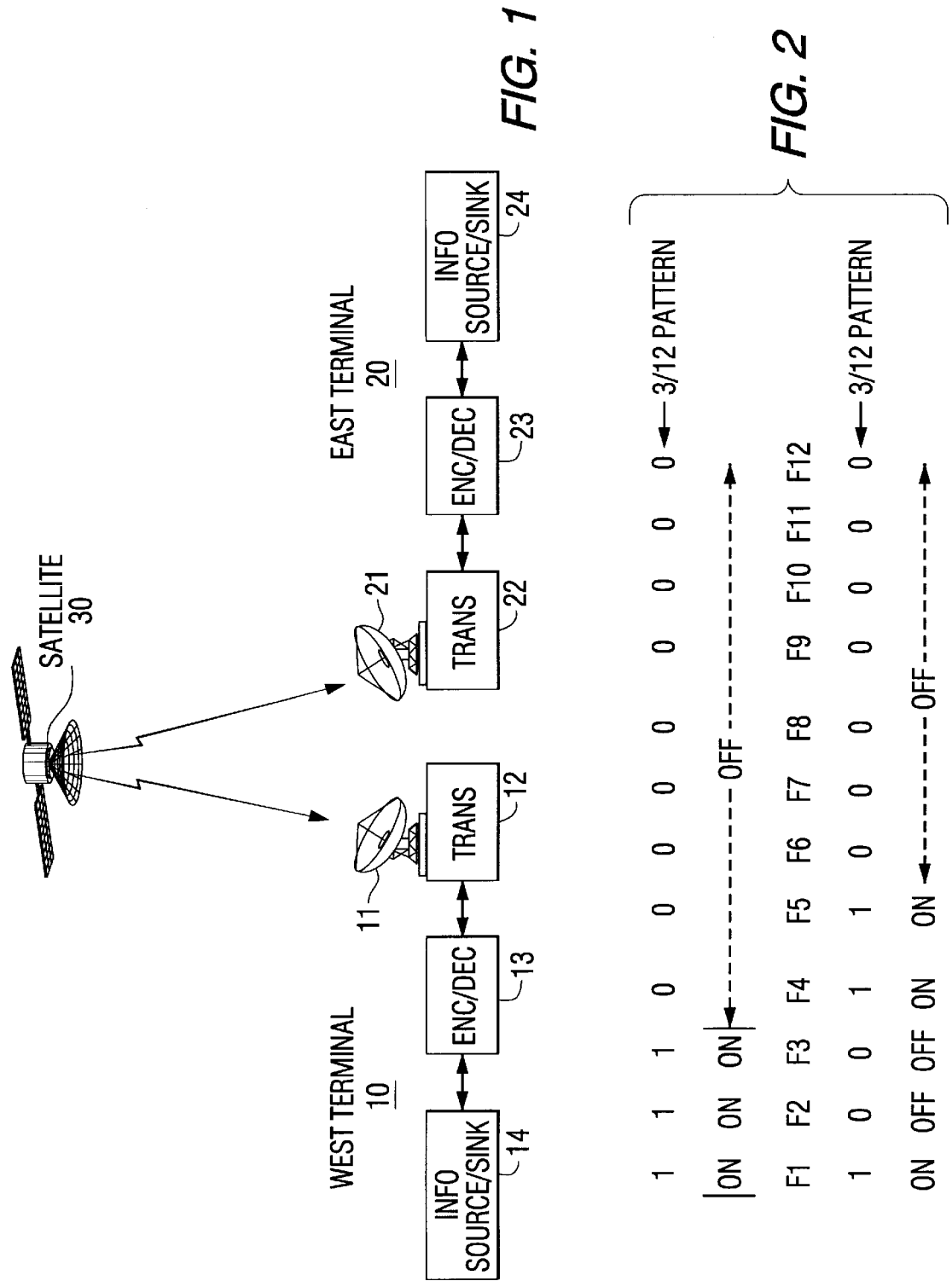

COMMUNICATION SCHEME USING NON-COHERENT FREQUENCY DETECTION OF TRELLIS-BASED CODING OF PLURAL TRANSMISSION FREQUENCIES PER BAUD

FIELD OF THE INVENTION

The present invention relates in general to communication systems, and is particularly directed to a reduced cost digital data transmission scheme intended for use with very small aperture terminal (VSAT) satellite communication systems, which combines non-coherent frequency detection with a trellis-coded, orthogonal signal set, from which multi-frequency modulation is produced, in a manner that is robust to phase noise and frequency uncertainty and is capable of achieving the performance of rate one-half phase shift keyed modulation.

BACKGROUND OF THE INVENTION

The vast majority of suppliers of satellite communication equipment currently employ some form of phase shift keying (PSK) modulation technique (e.g., BPSK or QPSK) in combination with Viterbi/sequential decoding for data recovery. At the relatively high data rates (e.g. on the order of one megabit per second or more), at which such systems have been designed to operate, because the maximum frequency uncertainty (on the order of 200 KHz, for example) and the bandwidth of the low noise block's (LNB's) phase noise is relatively small compared to the data rate, bit error rate performance is quite good and essentially insensitive to phase noise.

In today's telecommunication markets, both within the U.S. and overseas, however, a demand has arisen for VSAT equipment that is capable of operating at considerably lower data rates (e.g. on the order of 1200 bps to 128 Kbps). At such data rates, frequency uncertainty and phase noise become significant problems. The phase noise problem is particularly acute at such lower data rates, where phase noise power, which tends to be shaped around the carrier, occupies a larger percentage of the transmitted power.

One way to reduce the phase noise (and associated frequency uncertainty) problem in a PSK system is to employ a very stable (and expensive) low noise block down converter (LNB) at the VSAT terminal. Obviously, such an approach does not provide a viable solution to the problem, since a VSAT terminal, by its very nature, is intended to provide relatively low cost satellite communication service to the customer.

Another way to avoid the phase noise and frequency uncertainty problem is to use non-coherent frequency shift keying (FSK) having a frequency constellation containing a relatively large number of frequencies (M-ary (e.g. 16-ary) FSK), combined with forward error correction encoding. Although this technique is theoretically capable of approximating the bit error performance of rate one-half coded PSK modulation, it suffers from a substantial bandwidth usage penalty, resulting in a considerable increase in the cost of link usage.

SUMMARY OF THE INVENTION

In accordance with the present invention, we have developed a new and improved, relatively low cost, digital data transmission scheme, especially intended for use with VSAT satellite communication systems, which trellis-encodes data to be transmitted into a waveform comprised of an orthogonal signal set, and non-coherently detects and trellis-decodes the wave form to derive the data. The present invention combines non-coherent frequency detection with trellis-coded, multi-frequency modulation, in such a manner that it is immune to phase noise, so that it does not require expensive LNB components, while effectively achieving the performance of rate one-half phase shift keyed modulation.

Pursuant to the present invention, digital data to be transmitted is encoded to a prescribed code width. The code width bears a prescribed relationship to the size of a multiple frequency set and the selection of a given combination of frequencies within that multiple frequency set for transmission during a respective baud. In particular, this prescribed relationship is such that a first code portion of an encoded data sample, when subjected to a convolutional code for error correction purposes, provides a pointer to one of plural groups of frequencies into which the multiple frequency set has been partitioned. Each group contains a plurality of frequency combinations of the same number of frequencies per combination, but with the frequencies of each combination being different from those of any other combination, either within the same or another multi-frequency group.

The remaining or second code portion of the encoded data sample identifies the frequency combination within the group pointed to by the first code portion of the encoded data sample. Thus the combined first and second code portions of each encoded data sample produce, during a respective baud, a prescribed multi-frequency carrier waveform, which is transmitted from the transmitter site to the receiver site.

At the receiver site, a sequence of multi-frequency carrier waveforms respectively associated with successive data words that have been encoded at the transmitter site is detected by non-coherent frequency detection. In particular, the multi-frequency carrier waveform is applied to a set of matched filters, the number and frequencies of which correspond to those of the multi-frequency set employed at the transmitter. For each baud, the outputs of the matched filters are examined to determine the most likely set of frequencies to have been transmitted during that baud. For successive bauds, these most likely frequency combination determinations are used as soft decision inputs to a Viterbi decoder, the output of which is a sequence of digital codes representative of what has been determined to have been encoded at the transmitter.

In order to achieve a bit error rate performance that is effectively equivalent to that of rate one-half PSK, the present invention incorporates two error reduction operators into its encoding mechanism. The first involves assigning frequency combinations within a respective group, such that associated digital code patterns representative of such frequency combinations (as represented by the second code portion of an encoded data sample) have Hamming distances therebetween that are greater than the Hamming distance between any digital code pattern of that respective group and the digital code pattern of any other group. Since the minimum Hamming distance between digital code patterns of different groups is two, then the minimum Hamming distance between digital code patterns of the same group is four. This doubling of the intra-group Hamming distance provides sufficient error protection for enabling the non-coherent detector to make the correct choice of the frequency combination within the group, once the group has been identified.

The second error reduction operator involves encoding the first code portion of an encoded data sample by a convolutional code for error correction purposes. As pointed out above, the first code portion provides a pointer to one of plural groups of frequencies into which the multiple frequency set has been partitioned. Although the data sample word be originally encoded to the same code width as that obtained by combining the convolution-encoded first code portion and the second code portion, by simply parsing the data word into first and second code portions for group and frequency combination selection, to do so could result in an unacceptable ambiguity in the receiver as to the choice of which group of frequencies was transmitted.

Encoding the data to a code width smaller than that eventually obtained by combining the convolutional-encoded first code portion and second code portion, and then subjecting the (group-identification) first code portion to a forward error-correction convolutional code, effectively translates the asymptotic performance characteristic associated with an uncoded first code portion downward along the EBN0 axis, and brings it into effectively alignment with the asymptotic performance characteristic associated with the second code portion. As a consequence, the composite asymptotic performance characteristic associated with the convolutional-encoded first code portion and the second code portion (having a Hamming distance of four) falls within an acceptable EBN0 variation.

BRIEF DESCRIPTION OF THE DRAWINGS

FIG. 1 diagrammatically illustrates a reduced complexity illustration of a VSAT communication system in which the present invention may be incorporated;

FIG. 2 is a non-limiting example illustrating the manner in which a digital code vector may be used to specify which ones of a plurality of different carrier frequency tones are to be turned on or off during a respective baud;

DETAILED DESCRIPTION

Figure 3:
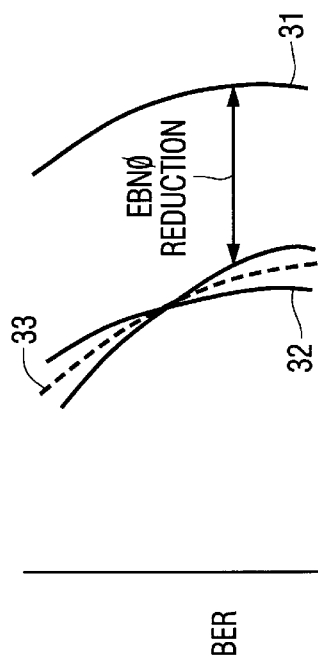
FIG. 3 diagrammatically illustrates the manner in which a convolutional forward error correction code effectively translates an asymptotic performance characteristic associated with an uncoded first code portion downward along the EBN0 axis to bring it into effective alignment with the asymptotic performance characteristic associated with a second (four bit) code portion, whose associated twelve bit patterns have a Hamming distance of four.

Before describing in detail the new and improved trellis-coded, multi-frequency modulation communication mechanism in accordance with the present invention, it should be observed that the invention resides primarily in what is effectively an integration of conventional communication system components and associated signalling interfaces. Consequently, the configuration of the components of the system and the manner in which they are interfaced with other communication equipment of a conventional VSAT communications system have been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations of the Figures are primarily intended to illustrate the major components of the system in a convenient functional grouping, whereby the present invention may be more readily understood.

Referring initially to FIG. 1, a reduced complexity illustration of a VSAT communication system of standard configuration in which the present invention may be incorporated is diagrammatically shown as comprising a 'west' VSAT earth station or terminal 10 and an 'east' VSAT earth station or terminal 20, which communicate with each other over associated uplink and downlink channels through a satellite 30. West terminal 10 includes a VSAT antenna 11 and an associated transceiver unit 12, which is coupled to an encoder/decoder unit 13, to which an information source/sink 14 of the west end user is coupled. Similarly, east terminal 20 includes a VSAT antenna 21 and an associated transceiver unit 22, which is coupled to an encoder/decoder unit 23, to which an information source/sink 24 of the west end user is coupled.

At a respective terminal, incoming data from an associated information source, that has been digitized to some prescribed code width, is encoded and IF up-converted onto an uplink carrier for transmission through the satellite 30. From the satellite, the transmission is downlinked to a receiving station, where it is IF down-converted and then decoded and output to a destination customer's equipment (information sink).

As pointed out previously, for the relatively high data rates (1 Mb/s or more) at which such VSAT systems customarily operate, rate one-half phase shift keying (PSK) modulation can be satisfactorily employed in combination with Viterbi/sequential decoding for data recovery, since the maximum frequency uncertainty (and accompanying phase noise) is relatively small compared to the data rate. However, to meet the current demand for VSAT equipment that provides cost effective service at data rates on the order of 1200 bps to 128 Kbps, the previously described frequency uncertainty and accompanying phase noise problem must be solved.

The present invention successfully circumvents this frequency uncertainty/phase noise problem, by trellis-encoding data to be transmitted into a waveform comprised of an orthogonal signal set, and non-coherently detects and trellis-decodes the wave form to derive the data. As will be described, the invention combines non-coherent frequency detection with a prescribed trellis-coded, multi-frequency encoding scheme that achieves a composite asymptotic bit error rate performance characteristic having an EBN0 variation effectively equivalent to that of current requirements for rate one-half PSK.

In order to achieve robust non-coherent frequency detection, without suffering a substantial bandwidth penalty, the communication mechanism according to the present invention encodes each respective data value as a plurality of carrier frequencies and transmits a multi-frequency, composite waveform during the baud associated with that data value. The number of carrier frequencies transmitted per baud is a prescribed number K selected from a larger set or pool of M available frequencies, where M is considerably larger than K, with a one baud spacing between the M frequencies of the set.

As will be described, for any given data sample value, its multi-bit digital code (one/zero pattern) is processed to specify a particular set of K frequencies taken from the available pool of N frequencies in such a manner as to ensure sufficient separation among code patterns that will realize a non-coherent frequency detection-based data recovery output having a bit error rate comparable to the current industry standard for rate one-half PSK of $10^{-7}$ BER at 5½ dB EBN0.

FIG. 2 is a non-limiting example illustrating the manner in which a digital code pattern or vector may be used to specify which ones of a plurality K of different frequency tones are to be turned on or off during a respective baud. Each bit position of the 'frequency pattern' digital code vector is associated with a respectively different carrier frequency. Although each digital code vector is depicted as an 'M equals twelve' bit code, it is to be understood that such a vector length is given for purposes of illustration. Other vector lengths may be used without departing from the encoding mechanism of the invention. As will be described, the choice of a code vector length of M equals twelve has been shown to provide a practical implementation of the encoder.

Within a respective frequency pattern code vector of M bits in length, each of a plurality of K 'one' bits represents turning its associated frequency on during the baud, and each of the remaining 'zero' bits represents turning its associated frequency off during the baud. Thus, for the illustrated example of the three-out-of-twelve (K/M=3/12) frequency pattern code 1110 0000 0000, since each of the first three bit positions associated with frequencies F1, F2 and F3 has a binary value of '1', frequencies F1, F2 and F3 are to be turned on during the baud, while frequencies F4 . . . F12 are to be turned off during the baud. Also shown in FIG. 2 is another three-out-of-twelve frequency pattern code 1001 1000 0000, which represents turning on a different set of three frequencies: F1, F4 and F5 during the baud, while frequencies F2, F3 and F6 . . . F12 are to be turned off during the baud.

A comparison of the two (3/12) frequency pattern codes of FIG. 2 reveals that each has a Hamming distance of four (associated with bits 2, 3, 4 and 5). It has been determined that a Hamming distance of four or greater in a multibit code vector, the bit positions of which are associated with the generation of a multi-frequency tone for data encoding and non-coherent detection in accordance with the present invention, will ensure that non-coherent frequency detection coupled with a Viterbi decoder will achieve the above-described sought after BER performance.

It should be noted that not every digital K-out-of-M code vector will have such a Hamming distance (four) with respect to every other vector of that code width resolution. Fortunately, an article by A. E. Brouwer et al, entitled: "A New Table of Constant Weight Codes," IEEE Transactions on Information Theory, Vol. 36, No. 6, November 1990, pp 1335, tabulates boundaries on the maximum number of code vectors of prescribed code width resolutions for specified Hamming distances.

In particular, the Brouwer et al article reveals that for any arbitrary group of respectively different three-out-of twelve digital code vectors, there is a maximum of twenty patterns that satisfy the minimum Hamming mutual distance of four criterion. This does not mean that there is only one, twenty member set that satisfies this Hamming requirement. Indeed, the total number of combinations of twelve items taken three at the time is 220. This total of 220 three-out-of-twelve bit patterns can be grouped into eleven groups of twenty each, such that each of the twenty (3/12) vectors satisfies the minimum Hamming mutual distance of four criterion. Although the Brouwer et al article does not indicate which patterns satisfy a given Hamming distance criterion or how one goes about determining the patterns associated with a given criterion (it simply tabulates that they exist), a determination of some or all of the eleven groups of twenty, three out-of-twelve patterns that satisfy the minimum Hamming distance of four criterion is essentially a trial and error evaluation exercise, which is readily accomplished by a skilled practitioner.

Advantageously, since a three-out-of-twelve pattern provides a total of 220 different code vectors, it encompasses a reasonably sized quantity (seven bits as a non-limiting example) that is representable in binary (power of two) format, specifically ($N=2^7$) 128 vectors, so that such patterns can be readily processed by digital signal processing circuitry, in which the code width of a digital data word is seven bits. In order to comply with the Hamming distance-four grouping limitation described in the Brouwer et al article, the N=128 vectors are partitioned into (J=8) groups of (L=16) three-out-of-twelve patterns. Namely, since the Brouwer et al article tabulates that one can assemble up to twenty members in an arbitrary group of three-out-of-twelve patterns of Hamming distance four, each of which has a Hamming distance of four, partitioning 128 three-out-of-twelve patterns into groups that do not exceed twenty each (e.g., L=16) ensures that each group will satisfy the distance four Hamming criterion.

In accordance with the present invention, to select which of the 128 patterns is to be used to encode a (seven bit) data word, each data word is subdivided into two code portions, one of which is used to select one of the eight groups, and a second of which is used to specify a particular three-out-of twelve tone-associated pattern within the selected group of sixteen. Although an original data sample could be encoded as seven bits and then simply parsed into a first code portion of three bits and a second code portion of four bits, for group selection and pattern selection, respectively, to do so could result in an unacceptable ambiguity in the receiver's decoder as to the choice of which group was transmitted.

To solve this potential ambiguity, the present invention encodes each data word to a lesser number of bits than required for group and pattern identification (e.g. a data word length D of six bits rather than seven) and then expands the data word size to the required code width. More particularly, for group selection, a first portion (e.g. C=2 bits) of the data word is subjected to a forward error correction (2/3) convolutional encoder, which produces the necessary (K=3) bit field used to identify which of the eight groups contains the three-out-of-twelve tone to be transmitted for the data value of interest. Since this three bit field identifies a particular group of tone triplets, the remaining (P=4) bits are used to identify which tone triplet within the group is to be transmitted. As a result of this sub-encoding mechanism, the multi-frequency carrier waveform for any input data code value is completely specified.

As diagrammatically illustrated in FIG. 3, the use of a convolutional forward error correction code to expand (C=2) originally encoded bits into (K=3) bits necessary for group identification effectively translates the asymptotic performance characteristic 31 associated with an uncoded first code portion downward along the EBN0 axis, and brings it into effective alignment with the asymptotic performance characteristic 32 associated with the second (P=4) bit code portion, whose associated twelve bit patterns have a Hamming distance of four. As a consequence, the composite asymptotic performance characteristic 33 associated with the convolutional-encoded first code portion and the second code portion falls within an acceptable EBN0 variation.

Figure 4:
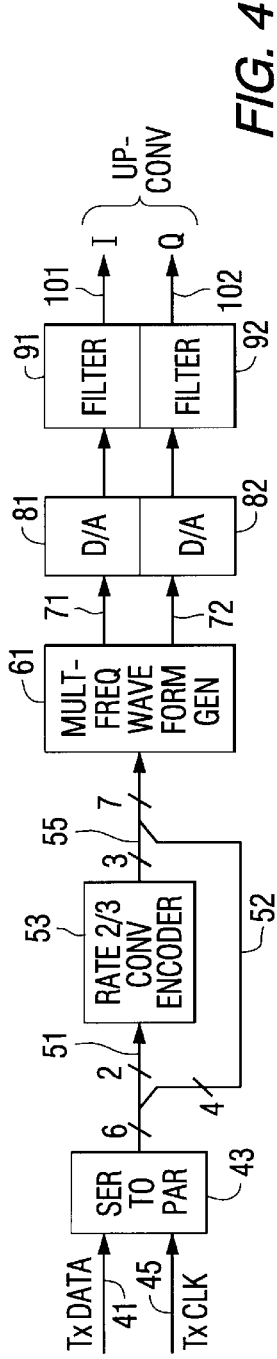
FIG. 4 diagrammatically illustrates the configuration of a multi-frequency waveform encoder according to the present invention.

FIG. 4 diagrammatically illustrates the configuration of a waveform encoder portion of the encoder/decoder equipment at a respective VSAT site, which is used to drive the up-converter circuitry of the transmitter unit of the terminal. To avoid unnecessarily cluttering the drawing, the transmit clock generator circuitry, which is conventional, is not shown. An incoming serial digital data stream to be transmitted supplied over a transmit data link 41 is coupled to a serial-to-parallel converter 43, which is clocked by a transmit data clock supplied over link 45. Serial-to-parallel converter outputs successive data words representative of successive data samples, of six bits each.

Pursuant to the invention, a first (C=2 bits) portion of this six bit data word is coupled over link 51 to a rate 2/3 convolutional encoder 53, which encodes its two bit input into three bits on output link 55. The remaining four-bit portion of the six bit data word is coupled over link 52 and combined with the three bits on link 55 to form a seven bit converted data word, which is applied to a multi-frequency waveform generator 61. Waveform generator 61 is preferably implemented as a digital ASIC (application specific integrated circuit) and is configured to translate the seven bit input code into a three carrier frequency output waveform.

For this purpose, waveform generator 61 may comprise combinational/matrix logic circuitry and associated look-up tables, which uses the three bit convolutional code converted portion of the input data word, output by encoder 53, to select one of the eight groups of sixteen tone triplet code patterns each. Generator 61 uses the other four bits of the seven bit pattern on link 57 to specify one of the sixteen tone triplets of the selected group. A digitally generated version of the selected multi-frequency waveform is applied over respective I and Q channels 71 and 72 and applied to digital-to-analog conversion units 81 and 82, respectively, which output analog signals corresponding to the composite tone triplet. The respective I and Q channels are then filtered in respective filters 91 and 92 and output over links 101 and 102 to respective I and Q channel feeds to the transmitter's associated IF channel up-converter unit.

Figure 5:
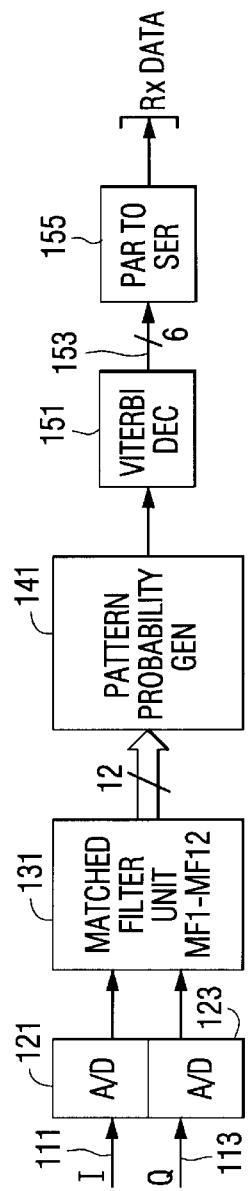
FIG. 5 diagrammatically illustrates the configuration of a non-coherent frequency detector and decoder according to the present invention.

FIG. 5 diagrammatically illustrates the configuration of the demodulator portion of the encoder/decoder equipment at a respective VSAT site, which is coupled to the down-converter circuitry of the receiver unit of the terminal. Like FIG. 4, FIG. 5 does not show clock generation (recovery) circuitry, which is conventional, in order to avoid unnecessarily cluttering the drawing. Received I and Q channels from the receiving terminal's down converter are coupled over respective links 111 and 113 to associated analog-to-digital converter units 121 and 123, which output digitally formatted versions of the received tone triplet.

The tone triplet waveform signals are applied to a matched filter unit 131 which contains a set of twelve matched filters MF1–MF12, each of which is associated with a respective one of the twelve frequency/tones F1–F12 employed at the transmitter site for generating the three-out-of-twelve tone triplets, as described above. The output of each matched filter MFi within unit 131 is a digital value representative of the energy received by that filter during a prescribed baud. In the absence of noise, in response to receipt of a three carrier frequency waveform, three of the matched filters within unit 131 will produce very large numerical values, while the outputs of the remaining nine filters should be zero. However, since noise is present, each matched filter output will have some finite value.

Each of the matched filter outputs is coupled to a pattern probability generator 141 which, like waveform generator 61, is preferably implemented as a digital ASIC and is configured to generate soft decision inputs to a downstream Viterbi decoder 151 as to the likelihood of which group and pattern within that group has been received for a given baud. For successive bauds, therefore, pattern probability generator 141 will supply soft decision inputs to the Viterbi decoder 151 of the most likely sequence of groups that have been transmitted, upon which the Viterbi decoder relies in generating successive outputs of the transmitted encoded data words (prior to deconvolution of the group designator bits).

To this end, the signal processing/logic circuitry within pattern probability generator 141 is configured to examine the numerical outputs of each of the twelve matched filters MF1–MF12. These matched filter values are then compared with stored copies of all 128 three-out-of-twelve patterns that are capable of being transmitted during any given baud to locate the most likely transmitted tone pattern.

For this purpose, the dot product between the numerical output values provided by the matched filters and the respective patterns is formed, thereby producing 128 dot product quantities $\Gamma_1$–$\Gamma_{128}$. These quantities $\Gamma_1$–$\Gamma_{128}$ are then grouped in groups of sixteen as: $(\Gamma_1$–$\Gamma_{16})$, $(\Gamma_{17}$–$\Gamma_{32})$, . . . , $(\Gamma_{113}$–$\Gamma_{128})$. The largest numerical quantity $\Gamma_{1i}$ within each group of sixteen is then selected to represent the likelihood $\tau_i$ that its particular group was transmitted during the baud. The eight derived likelihood values $\tau_1$–$\tau_8$ are output as soft decision data values for use by Viterbi decoder 151 during its processing of sequential group soft decision data to identify which groups have been transmitted during successive bauds.

Each group in the sequence decoded by the Viterbi decoder 151 produces a two bit code, corresponding to that supplied to the rate 2/3 convolutional encoder 53 at the transmitter (FIG. 4, described above). For a respective group decision made by the Viterbi decoder 151, the four bit code associated with pattern for that baud, which was the basis for quantity $\tau_i$, is combined with the two bit code output, so as to regenerate the original six bit data word. The decoded six bit data word is then coupled over link 153 to parallel-to-serial converter 155 which outputs the recovered data to associated user equipment.

As will be appreciated from the foregoing description, by combining non-coherent frequency detection with trellis-coded, multi-frequency modulation, as described above, the present invention is able to provide a relatively low cost (not requiring expensive LNB components) digital communication technique, that not only meets the above-described demand for VSAT equipment that is capable of operating at considerably lower data rates (e.g. on the order of 1200 bps to 128 Kbps), but in doing so achieves the performance of rate one-half phase shift keyed modulation.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A method of communicating data over a communication link from a transmit site to a receive site comprising the steps of:

(a) at said transmit site, trellis-encoding data to be transmitted into successive waveforms, each of which waveforms is comprised of a respective plurality of different simultaneously occurring frequencies in dependence upon respective digital code values of successive digital data words of said data, and transmitting said successive waveforms during successive bauds associated with successive digital data words of said data; and (b) at said receive site, detecting and trellis-decoding said successive waveforms to derive said data.

2. A method according to claim 1, wherein step (a) comprises encoding a first portion of said data with a forward error correction code to produce a first code and selecting a plurality of respectively different frequencies of which a respective one of said successive waveforms is simultaneously comprised in accordance with said first code.

3. A method according to claim 1, wherein step (a) comprises encoding a first portion of said data with a forward error correction code to produce a first code and selecting a plurality frequency components of which a respective one of said successive waveforms is simultaneously comprised in accordance with said first code and a second portion of said data.

4. A method according to claim 3, wherein step (a) further comprises generating a plurality N of multibit digital codes, each of said multibit digital codes having a code width of M bits, K of which have a first binary value and M−K of which have a second binary value, and wherein said plurality N of multibit digital codes are grouped into J sets of L digital codes per set, and wherein each bit position of a respective digital code is associated with a respectively different frequency and such that the K bits of said respective digital code having said first binary value select K ones of a plurality of M frequencies of which said respective one of said successive waveforms is simultaneously comprised, and wherein step (a) comprises selecting a respective one of said J sets of digital codes in accordance with said first code, and selecting one of the L digital codes within the selected one of said J sets in accordance with said second portion of said data.

5. A method according to claim 4, wherein step (b) comprises processing said respective one of said successive waveforms through a set of M matched filters, respectively tuned to said M frequencies, to generate information representative of the most likely transmitted K ones of said M frequencies, and processing said information by means of a trellis decoder to recover said data.

6. A method according to claim 5, wherein step (b) further comprises processing outputs of said set of M matched filters to generate information representative of the most likely set of L digital codes containing a digital code whose K bits have been encoded as a transmitted multi-frequency waveform, and processing said information by means of a trellis decoder to identify one of said N multibit digital codes, and decoding said identified one of said N multibit digital codes to recover said data.

7. A method according to claim 6, wherein step (b) comprises producing at an output of said trellis decoder said first portion of said data, and combining said first portion of said data with a code representative of identified multibit digital codes within a transmitted set of L digital codes to recover said data.

8. A method according to claim 4, wherein, within each set of L digital codes a Hamming distance between any two digital codes thereof is greater than a Hamming distance between a digital code thereof and a digital code of another of said J sets.

9. A method according to claim 4, wherein, within each set of L digital codes, a Hamming distance between any two digital codes thereof is greater than two.

10. A method according to claim 1, wherein step (a) comprises establishing a plurality of M respectively different frequencies, and trellis-encoding data to be transmitted into a respective one of said successive waveforms as a prescribed simultaneous combination of a set of K ones of said M respectively different frequencies in dependence upon respective digital code values of a respective one of said successive digital data words of said data.

11. A method according to claim 10, wherein step (b) comprises processing said respective on of said successive waveforms through a set of M matched filters, respectively tuned to said M frequencies, to generate information representative of the most likely transmitted K ones of said M frequencies, and processing said information by means of a trellis decoder to recover said data.

12. A method of communicating digital data between a transmit site and a receive site comprising the steps of:

(a) establishing a plurality of J groups of L, K-out-of-M respectively different carrier frequencies, where K is greater than one;

(b) for a respective baud, convolutionally encoding a first portion of said digital data to generate a first digital code which points to one of said J groups of L, K-out-of-M respectively different carrier frequencies, and selecting, in accordance with a second portion of said digital data, one of the K-out-of-M respectively different carrier frequencies of the group pointed to by said first digital code; and (c) transmitting a multi-frequency waveform to said receiver site, said multi-frequency waveform comprising the K-out-of-M respectively different carrier frequencies selected in step (b).

13. A method according to claim 12, further comprising step (d), at said receiver site, non-coherently detecting said multi-frequency waveform comprised of said K-out-of-M respectively different carrier frequencies transmitted in step (c).

14. A method according to claim 13, wherein step (d) comprises processing said multi-frequency waveform through a set of M matched filters, respectively tuned to said M respectively different frequencies, and further comprising the step of (e) processing outputs of said matched filters to generate information representative of the most likely transmitted K ones of said M respectively different frequencies, and processing said information by means of a trellis decoder to recover said digital data.

15. A method of recovering digital data that has been trellis-encoded into successive waveforms, each of which waveforms is comprised of a respective plurality of different simultaneously occurring frequencies in dependence upon respective digital code values of successive digital data words of said digital data, and transmitted during successive bauds associated with successive digital data words of said digital data, said method comprising the steps of:

(a) detecting said successive waveforms; and (b) processing said successive waveforms by means of a trellis decoder to recover said digital data, and wherein said digital data has been trellis-encoded by establishing a plurality of J groups of L, K-out-of-M respectively different frequencies, where K is greater than one and, for a respective baud, convolutionally encoding a first portion of said digital data to generate a first digital code which points to one of said J groups of L, K-out-of-M respectively different frequencies, and selecting, in accordance with a second portion of said digital data, one of the L, K-out-of-M respectively different frequencies of the group pointed to by said first digital code, said selected one of the L, K-out-of-M respectively different frequencies having been transmitted as a respective one of said successive waveforms, and wherein step (a) comprises processing said respective one of said successive waveforms through a set of M matched filters, respectively tuned to said M frequencies, and wherein step (b) comprises processing outputs of said matched filters to generate information representative of the most likely transmitted K ones of said M frequencies, and processing said information by means of a trellis decoder to recover said digital data.

16. A method according to claim 15, wherein step (b) further comprises processing outputs of said set of M matched filters to generate information representative of the most likely set of L digital codes containing a digital code whose K bits have been encoded as a transmitted multifrequency waveform, and processing said information by means of a trellis decoder to identify one of a plurality of N multibit digital codes, and decoding said identified one of said N multibit digital codes to recover said digital data.

17. A method according to claim 15, wherein step (b) comprises producing at an output of said trellis decoder said first portion of said data and combining said first portion of said data with a code representative of identified multibit digital codes within a transmitted set of L digital codes to recover said data.

18. A method of encoding digital data to be transmitted over a communication link from a transmit site to a receive site comprising the steps of:

(a) establishing a plurality N of M bit digital codes respectively associated with different sets of frequencies selected from a plurality of M frequencies;

(b) dividing said plurality of M bit digital codes into J groups of L, M bit digital codes, such that any M bit digital code within a respective group of L digital codes has a prescribed Hamming distance relative to any other M bit digital code within said respective group;

(c) for each respective group of L digital codes, generating a P bit digital code representative of a respective digital code therein, where $L=2^P$;

(d) generating a plurality of C bit digital codes and subjecting each of said plurality of C bit digital codes to a prescribed error correction encoding mechanism, such that each C bit code is converted into a respective one of a plurality of K bit digital group codes respectively representative of said J groups of codes, where $J=2^K$ and C<K;

(e) combining said K bit and P bit digital codes into a plurality of $2^{K+P}$ codes, respectively associated with different sets of frequencies selected from a plurality of N frequencies;

(f) digitally encoding information to be transmitted into an C+P bit digital code representative thereof;

(g) converting said C+P bit digital code produced in step (f) into a respective one of said $2^{K+P}$ codes of step (e); and (h) simultaneously generating each frequency of a respective one of said different sets of frequencies in accordance with said respective one of said $2^{K+P}$ codes converted in step (g).

19. A method according to claim 18, wherein step (f) comprises digitally encoding sequential units of information to be transmitted into sequential C+P bit digital codes representative thereof, step (g) comprises converting each sequential C+P bit digital code produced in step (f) into a respective one of said $2^{K+P}$ codes of step (e), and wherein step (h) comprises sequentially generating respective sets of frequencies, such that the frequencies of a respective set are generated simultaneously, and wherein respective sets of frequencies sequentially generated in step (h) are defined in accordance with respective ones of sequential $2^{K+P}$ codes converted in step (g).

20. A method according to claim 19, wherein step (h) further comprises transmitting the respective sets of sequentially generated frequencies over said communication link to said receiver site, and wherein, at said receiver site, further comprising the step of (i) receiving the respective sets of frequencies sequentially transmitted in step (h), and (j) non-coherently detecting the sets of frequencies sequentially received in step (i).

21. A method according to claim 20, wherein step (j) comprises processing the respective sets of frequencies sequentially received in step (i) to identify the most likely frequencies of each respective set, and processing the identified most likely frequencies using a Viterbi decoding mechanism to derive the frequencies of each respective set.

22. A method according to claim 21, further comprising the steps of (k) of converting the derived frequencies of each respective set into a respective one of said $2^{K+P}$ codes converted in step (g), and (l) translating said respective one of said $2^{K+P}$ codes converted in step (k) into a C+P bit digital code representative of a respective information unit.

23. A method according to claim 18, wherein said prescribed Hamming distance is greater than the Hamming distance between said any M bit digital code within said respective group and each M bit digital code of each other group of said J groups.

24. A method according to claim 18, wherein each M bit digital code of said plurality of M bit digital codes is orthogonal to every other M bit digital code of said plurality of M bit digital codes.

25. A method according to claim 24, wherein said prescribed Hamming distance is greater than the Hamming distance between said any M bit digital code within said respective group and each M bit digital code of each other group of said J groups.

26. A method of communicating information over a communication link from a transmit site to a receive site comprising the steps of:

(a) digitally encoding a unit of information to be transmitted into a J bit digital code representative thereof;

(b) subjecting C bits of said J bit digital code to an error correction encoding mechanism, so as to produce a K bit code, where K>C;

(c) establishing a plurality of N bit digital codes respectively associated with different sets of frequencies selected from a plurality of N frequencies, such that each N bit digital code of said plurality of N bit digital codes is orthogonal to every other N bit digital code of said plurality of N bit digital codes;

(d) dividing said plurality of N bit digital codes into $2^K$ groups of N bit digital codes of M digital codes per group, such that any N bit digital code within a respective group has a prescribed Hamming distance relative to any other N bit digital code within said respective group, that is greater than the Hamming distance between said any N bit digital code within said respective group and each N bit digital code of each other group of said $2^K$ groups;

(e) for each respective group of M digital codes, generating a P bit digital code representative of a respective digital code therein, where $M=2^P$;

(f) simultaneously transmitting each of the frequencies of a respective one of said frequency sets associated with a respective one of said N digital codes representative thereof and selected in accordance with a combination of said K bit and P bit digital codes.

27. A method according to claim 26, wherein step (a) comprises digitally encoding sequential units of information to be transmitted into sequential J bit digital codes representative thereof, and wherein step (f) comprises sequentially generating respective sets of frequencies, such that the frequencies of a respective set are generated simultaneously, and wherein respective sets of frequencies sequentially generated in step (f) are defined in accordance with respective ones of sequential $2^{K+P}$ codes.

28. A method according to claim 27, further comprising the steps of, at said receiver site, (g) receiving the respective sets of frequencies sequentially transmitted in step (f), and (h) non-coherently detecting the sets of frequencies sequentially received in step (g).

29. A method according to claim 28, wherein step (h) comprises processing the respective sets of frequencies sequentially received in step (g) to identify the most likely transmitted frequencies of each respective set, and processing the identified most likely frequencies using a Viterbi decoding mechanism to derive the frequencies of each respective set.

30. A method according to claim 29, further comprising the steps of (i) of converting the derived frequencies of each respective set into a respective one of said $2^{K+P}$ codes, and (j) translating said respective one a respective one of said $2^{K+P}$ codes into a respective J bit digital code representative of a respective information unit.

31. An arrangement for communicating information over a communication link from a transmit site to a receive site comprising:

an error correction encoder, which is coupled to receive C bits of a D bit digital code and is operative to convert said C bits of said D bit digital code into a K bit error correction code, where K>C; and a multi-frequency generator which is operative to simultaneously generate K selected frequencies of an available plurality of N frequencies, said K selected frequencies being associated with K bits of an N bit digital code, said N bit digital code being derived from a selected group of $2^K$ groups of $2^{D-C}$, N bit digital codes, each N bit digital code being orthogonal to every other N bit digital code, said selected group being identified by said K bit error correction code, and said derived N bit digital code being identified by the D–C bits of said D bit digital code, and wherein any N bit digital code within a respective group of $2^{D-C}$, N bits digital codes has a prescribed Hamming distance relative to any other N bit digital code within said respective group, that is greater than the Hamming distance between said any N bit digital code within said respective group and each N bit digital code of each other group of said $2^K$ groups of $2^{D-C}$, N bit digital codes.

32. An arrangement according to claim 31, further including a digital encoder which is operative to encode sequential units of information to be transmitted into sequential D bit digital codes representative thereof, and wherein said multi-frequency generator is operative to sequentially generate respective sets of K frequencies.

33. An arrangement according to claim 32, wherein said receiver site includes a non-coherent frequency detector which is operative to detect the sets of frequencies sequentially transmitted over said communication link from said transmit site.

34. An arrangement according to claim 32, wherein said non-coherent frequency detector is operative to identify the most likely frequencies of each respective set, and a Viterbi decoder coupled thereto to derive the frequencies of each respective set.

35. An arrangement according to claim 34, wherein said receiver site further includes a converter which is operative to convert the derived frequencies of each respective set into a respective D bit digital code representative of a respective information unit.

36. An arrangement according to claim 35, wherein said receiver site converter is operative to convert the derived frequencies of each respective set into a respective K+P bit digital code, and to translate said respective K+P bit digital code into a respective D bit digital code representative of a respective information unit.

37. An arrangement according to claim 36, wherein said receiver site converter comprises an error correction decoder which is operative to convert K bits of said respective K+P bit digital code into a respective C bit digital code and to combine said respective C bit digital code with said respective K+P bit digital code so as to derive said respective D bit digital code representative of a respective information unit.

38. A system for transmitting data over a communication link from a transmit site to a receive site comprising:

at said transmit site, a trellis-based encoder which is operative to encode data to be transmitted into a waveform in which a plurality of respectively different carrier frequencies are simultaneously present; and at said receive site, a non-coherent frequency detector which is operative to detect the respectively different carrier frequencies simultaneously present in said waveform and derive said data, and wherein said trellis-based includes a forward error correction coder, which is operative to encode a first portion of said data to produce a first code, and wherein said trellis-based encoder selects said plurality of respectively different carrier frequencies simultaneously present in said waveform in accordance with said first code.

39. A system according to claim 38, wherein said trellis-based encoder comprises a forward error correction which is operative to encode a first portion of said data with code to produce a first code, and wherein said trellis-based encoder is operative to select said plurality of respectively different carrier frequencies simultaneously present in said waveform in accordance with said first code and a second portion of said data.

40. A system according to claim 39, wherein said trellis-based encoder is operative to generate any one of a plurality N of multibit digital codes, each of said multibit digital codes having a code width of M bits, K of which have a first binary value and M–K of which have a second binary value, and wherein said plurality N of multibit digital codes are grouped into J sets of L digital codes per set, and wherein each bit position of a respective digital code is associated with a respectively different carrier frequency and such that the K bits of said respective digital code having said first binary value select K ones, of a plurality of respectively different M carrier frequencies, of which said waveform is simultaneously comprised, said trellis-based encoder selecting a respective one of said J sets of digital codes in accordance with said first code, and selecting one of the L digital codes within the selected one of said J sets in accordance with said second portion of said data.

41. A system according to claim 40, wherein said non-coherent frequency detector comprises a set of M matched filters to which said waveform is applied, said set of M matched filters being respectively tuned to said respectively different M carrier frequencies, and generating information representative of the most likely simultaneously transmitted K ones of said respectively different M carrier frequencies, and further including a trellis decoder to which said information is applied for recovering said data.

42. A system according to claim 41, further comprising a pattern likelihood detector coupled to the outputs of said set of M matched filters and being operative to generate information representative of the most likely set of L digital codes containing a digital code whose K bits have been encoded as a transmitted multi-frequency waveform of K respectively different, simultaneously transmitted, and coupling said information to said trellis decoder to decode one of said N multibit digital codes to recover said data.

43. A system according to claim 42, wherein said trellis decoder is operative to recover said first portion of said data, said first portion of said data being combined with a code representative of identified multibit digital codes within a transmitted set of L digital codes to recover said data.

44. A system according to claim 40, wherein, within each set of L digital codes, a Hamming distance between any two digital codes thereof is greater than a Hamming distance between a digital code thereof and a digital code of another of said J sets.

45. A system according to claim 40, wherein, within each set of L digital codes, a Hamming distance between any two digital codes thereof is greater than two.

46. A system for transmitting data over a communication link from a transmit site to a receive site comprising:
  at said transmit site, a trellis-based encoder which is operative to encode data to be transmitted into a waveform in which a plurality of respectively different carrier frequencies are simultaneously present; and
  at said receive site, a non-coherent frequency detector which is operative to detect the respectively different carrier frequencies simultaneously present in said waveform and derive said data, and wherein
  said encoder is operative, during successive bauds associated with successive digital data words, to generate a carrier sequence having successive multi-frequency carrier waveforms, each of which is comprised of a respective plurality of different simultaneous carrier frequencies, the frequency compositions of said successive multi-frequency carrier waveforms being dependent upon respective digital code values of said successive digital data words.

47. A system, for transmitting data over a communication link from a transmit site to a receive site comprising:
  at said transmit site, a trellis-based encoder which is operative to encode data to be transmitted into a waveform in which a plurality of respectively different carrier frequencies are simultaneously present; and
  at said receive site, a non-coherent frequency detector which is operative to detect the respectively different carrier frequencies simultaneously present in said waveform and derive said data, and wherein
  said encoder is operative to encode data to be transmitted onto said waveform as a prescribed combination of a set of K simultaneously transmitted ones of M respectively different frequencies, and wherein
  said non-coherent frequency detector comprises a set of M matched filters, respectively tuned to said M respectively different frequencies, and a pattern detector coupled to said matched filters and generating information representative of the most likely simultaneously transmitted K ones of said M respectively different frequencies, and further including a trellis-decoder which is operative to process said information and recover said data.

48. An arrangement for communicating digital data between a transmit site and a receive site comprising the steps of:
  an encoder which is capable of generating a plurality of J groups of L, K-out-of-M respectively different carrier frequencies, where K is greater than one and, for a respective baud, is operative to convolutional encode a first portion of said digital data into a first digital code, which points to one of said J groups of L, K-out-of-M respectively different carrier frequencies, and selects, in accordance with a second portion of said digital data, one of the K-out-of-M respectively different carrier frequencies of the group pointed to by said first digital code; and
  a transmitter which transmits a multi-frequency waveform to said receiver site, said multi-frequency waveform comprising the selected K-out-of-M respectively different carrier by means of a trellis decoder to recover said digital data.

49. An arrangement according to claim 48, further comprising, at said receiver site, a non-coherent detector to which said multi-frequency waveform comprised of said K-out-of-M respectively different carrier frequencies is applied, said non-coherent detector processing said multi-frequency waveform by means of a trellis decoder to recover said digital data.

50. An arrangement according to claim 49, wherein said non-coherent detector includes a set of M matched filters, respectively tuned to said M frequencies, and a pattern detector which processes outputs of said set of M matched filters to generate information representative of the most likely transmitted K ones of said M frequencies, said information being supplied to said trellis decoder.

51. A demodulator for recovering digital data that has been trellis-encoded into a waveform comprised of a plurality of respectively different carrier frequencies and transmitted simultaneously as a multi-frequency carrier waveform comprising a non-coherent frequency detector coupled to receive said multi-frequency carrier waveform and to generate signals representative of the most likely received frequencies in said multi-carrier frequency carrier waveform, and a trellis-based signal processor, which is operative to process said signals representative of the most likely received frequencies in said multi-carrier frequency carrier waveform and recovering therefrom said digital data.

52. A demodulator according to claim 51, wherein said digital data has been trellis-encoded by establishing a plurality of J groups of L, K-out-of-M respectively different carrier frequencies, where K is greater than one and, for a respective baud, convolutionally encoding a first portion of said digital data to generate a first digital code which points to one of said J groups of L, K-out-of-M respectively different carrier frequencies, and selecting, in accordance with a second portion of said digital data, one of the K-out-of-M respectively different carrier frequencies of the group pointed to by said first digital code, said selected one of the K-out-of-M respectively different carrier waveforms having been transmitted as said multi-frequency waveform, and wherein said non-coherent frequency detector includes a set of M matched filters, respectively tuned to said M respectively different carrier frequencies, and a most likely pattern detector to which outputs of said matched filters are coupled and generating said signals representative of the most likely transmitted K ones of said M respectively different carrier frequencies in said multi-carrier frequency carrier waveform, for application to said trellis-based signal processor.

53. A demodulator according to claim 52, wherein said most likely pattern detector is operative to process outputs of said set of M matched filters to generate said information representative of the most likely set of L digital codes containing a digital code whose K bits have been encoded as a transmitted multi-frequency waveform.

54. A demodulator according to claim 52, wherein said trellis decoder is operative to recover said first portion of said data, said first portion of said data being combined with a code representative of identified multibit digital codes within a transmitted set of L digital codes to recover said data.

55. A method, of transmitting data over a communication link from a transmit site to a receive site comprising the steps of:
  (a) at said transmit site, trellis-encoding data to be transmitted into a waveform comprised of a plurality of simultaneously transmitted, respectively different frequencies selected in accordance with an orthogonal signal set of a dimension greater than two; and
  (b) at said receive site, non-coherently detecting and trellis-decoding said waveform to derive said data, and wherein
  step (a) comprises establishing a set of digital codes that are mutually orthogonal and trellis-encoding data to be transmitted into said waveform comprised of said plurality of respectively different simultaneously transmitted frequencies selected in accordance with said set of mutually orthogonal digital codes.

56. A method according to claim, of transmitting data over a communication link from a transmit site to a receive site comprising the steps of:
  (a) at said transmit site, trellis-encoding data to be transmitted into a waveform comprised of a plurality of simultaneously transmitted, respectively different frequencies selected in accordance with an orthogonal signal set of a dimension greater than two; and
  (b) at said receive site, non-coherently detecting and trellis-decoding said waveform to derive said data, and wherein
  step (a) comprises establishing a set of digital codes that are mutually orthogonal and trellis-encoding data to be transmitted into a multi-frequency waveform comprised of said plurality of simultaneously transmitted, effectively different frequencies selected in accordance with said set of mutually orthogonal digital codes.

57. A method according to claim 55, wherein step (a) comprises encoding a first portion of said data with a forward error correction code to produce a first code and selecting said plurality of respectively different frequencies of which said waveform is simultaneously comprised in accordance with said first code.

58. A method according to claim 55, wherein step (a) comprises encoding a first portion of said data with a forward error correction code to produce a first code and selecting said plurality respectively different frequencies of which said waveform is simultaneously comprised in accordance with said first code and a second portion of said data.

59. A method according to claim 56, wherein step (b) comprises processing outputs of a set of M matched filters to generate information representative of the most likely set of digital codes containing a digital code encoded as a transmitted multi-frequency waveform, and processing said information by means of a trellis decoder to identify a multibit digital codes, and decoding said identified multibit digital code to recover said data.

60. A method according to claim 55, wherein a Hamming distance between any two digital codes of said set is greater than two.

61. A method according to claim 55, wherein step (a) comprises, during successive bauds associated with successive digital data words, transmitting a carrier having successive waveforms, each of which is comprised of a plurality of simultaneously occurring, respectively different carrier frequencies, the frequency compositions said successive waveforms being dependent upon respective digital code values of said successive digital data words.

62. A method according to claim 55, wherein step (a) comprises establishing a plurality of M respectively different frequencies, and trellis-encoding data to be transmitted into said waveform as a prescribed combination of a set of simultaneously transmitted K ones of said M respectively different frequencies.

63. A method according to claim 62, wherein step (b) comprises processing said waveform through a set of M matched filters, respectively tuned to said M respectively different frequencies, to generate information representative of the most simultaneously likely transmitted K ones of said M respectively different frequencies, and processing said information by means of a trellis decoder to recover said data.

64. A method according to claim 56, wherein, within each set of digital codes, a Hamming distance between any two digital codes thereof is greater than a Hamming distance between a digital code thereof and a digital code of another set of digital codes.

* * * * *